(12) United States Patent
Veereshwara et al.

(10) Patent No.: US 11,652,802 B2
(45) Date of Patent: May 16, 2023

(54) POLICY BASED PERSONALLY IDENTIFIABLE INFORMATION LEAKAGE PREVENTION IN CLOUD NATIVE ENVIROMENTS

(71) Applicant: Cisco Technology, Inc., San Jose, CA (US)

(72) Inventors: Srinivas Nukala Veereshwara, San Ramon, CA (US); Anil Bhikuayya Jangam, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 562 days.

(21) Appl. No.: 16/806,676

(22) Filed: Mar. 2, 2020

(65) Prior Publication Data
US 2021/0273918 A1 Sep. 2, 2021

(51) Int. Cl.
| | |
|---|---|
| *H04L 29/06* | (2006.01) |
| *H04L 9/40* | (2022.01) |
| *G06F 21/62* | (2013.01) |
| *G06Q 50/26* | (2012.01) |

(52) U.S. Cl.
CPC ...... *H04L 63/0414* (2013.01); *G06F 21/6245* (2013.01); *G06Q 50/265* (2013.01); *H04L 63/0421* (2013.01)

(58) Field of Classification Search
None
See application file for complete search history.

(56) References Cited

U.S. PATENT DOCUMENTS

| | | | |
|---|---|---|---|
| 7,519,813 B1 | 4/2009 | Cox et al. | |
| 2002/0138631 A1* | 9/2002 | Friedel | H04L 63/20 709/229 |
| 2019/0273746 A1* | 9/2019 | Coffing | G06Q 20/40 |
| 2019/0377901 A1 | 12/2019 | Balzer et al. | |

FOREIGN PATENT DOCUMENTS

WO 2019/203785 10/2019

OTHER PUBLICATIONS

"Overview of the Microperimeter Security," Jan. 2, 2020, pp. 1-2 https://docs.microperimeter.cloudentity.com/concepts/microperimeter_security/overview/.

* cited by examiner

*Primary Examiner* — William J. Goodchild
(74) *Attorney, Agent, or Firm* — Polsinelli (57) ABSTRACT

A system performs a method including: generating a posture of a first microservice in a microservice based network environment; implementing the posture of the first microservice at a sidecar of the first micro service; distributing the posture of the first microservice to a sidecar of a second microservice in the microservice based network environment; implementing the posture of the first microservice at the sidecar of the second micro service; and controlling communication of personally identifiable information between the first microservice and the second microservice based on the posture of the first microservice through either or both the sidecar of the first microservice and the sidecar of the second micro service. The posture of the first microservice includes an identification of one or more types of personally identifiable information that the first microservice is authorized to distribute and one or more types of personally identifiable information that the first microservice is authorized to receive.

20 Claims, 9 Drawing Sheets

POLICY BASED PERSONALLY IDENTIFIABLE INFORMATION LEAKAGE PREVENTION IN CLOUD NATIVE ENVIROMENTS

TECHNICAL FIELD

The subject matter of this disclosure relates in general to the field of Personally Identifiable Information leakage prevention, and more particularly, to controlling the leakage of Personally Identifiable Information across microservices in a microservice-based network environment.

BACKGROUND

Providing security in the communication of Personally Identifiable Information is important in network environments. Specifically, in microservice-based network environments, Personally Identifiable Information (PII) can be inadvertently leaked as micro services exchange information with each other, e.g. in providing access to network services. In particular, as micro service-based network environments grow in prevalence and the amount of information that is exchanged between microservices increases, the possibility of leaking Personally Identifiable Information in a network environment increases.

BRIEF DESCRIPTION OF THE FIGURES

To provide a more complete understanding of the present disclosure and features and advantages thereof, reference is made to the following description, taken in conjunction with the accompanying drawings, in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

A method can include generating a posture of a first micro service in a micro service based network environment, the posture of the first microservice includes an identification of one or more types of personally identifiable information that the first microservice is authorized to distribute and one or more types of personally identifiable information that the first micro service is authorized to receive; implementing the posture of the first micro service at a sidecar of the first microservice; distributing the posture of the first microservice to a sidecar of a second microservice in the microservice based network environment; implementing the posture of the first microservice at the sidecar of the second microservice; and controlling communication of personally identifiable information between the first micro service and the second micro service based on the posture of the first micro service through either or both the sidecar of the first micro service and the sidecar of the second micro service.

A system can include one or more processors; and at least one computer-readable storage medium having stored therein instructions which, when executed by the one or more processors, cause the one or more processors to perform the following operations: generating a posture of a first micro service in a micro service based network environment, the posture of the first microservice includes an identification of one or more types of personally identifiable information that the first micro service is authorized to distribute and one or more types of personally identifiable information that the first micro service is authorized to receive; implementing the posture of the first micro service at a sidecar of the first micro service; distributing the posture of the first micro service to a sidecar of a second micro service in the micro service based network environment; implementing the posture of the first microservice at the sidecar of the second microservice; and controlling communication of personally identifiable information between the first microservice and the second microservice based on the posture of the first microservice through either or both the sidecar of the first microservice and the sidecar of the second micro service.

A non-transitory computer-readable storage medium having stored therein instructions which, when executed by one or more processors, cause the one or more processors to perform the following operations: generating a posture of a first microservice in a microservice based network environment, the posture of the first microservice includes an identification of one or more types of personally identifiable information that the first microservice is authorized to distribute and one or more types of personally identifiable information that the first microservice is authorized to receive; implementing the posture of the first microservice at a sidecar of the first micro service; distributing the posture of the first microservice to a sidecar of a second microservice in the microservice based network environment; implementing the posture of the first microservice at the sidecar of the second microservice; and controlling communication of personally identifiable information between the first microservice and the second microservice based on the posture of the first microservice through either or both the sidecar of the first microservice and the sidecar of the second micro service.

EXAMPLE EMBODIMENTS

The disclosed technology addresses the need in the art for providing security in the communication of personally identifiable information (PII) in network environments. In particular, the disclosed technology addresses the need in the art for preventing PII leakage in microservice-based network environments. The present technology involves system, methods, and computer-readable media for controlling PII exchange between mircroservices in a microservice-based network environment. In particular, the present technology involves systems, methods, and computer-readable media for controlling PII exchange across microservices while the services are unaware of such control. Further, the present technology involves systems, methods, and computer-readable media for controlling PII exchange form both generator and receiver sides in a microservice-based network environment.

As used herein, the terms "Personally identifiable information," or "PII" shall be used to refer to any data that could potentially be used to identify a particular person. Examples of such terms include, but are not limited to a full name, a Social Security number, a driver's license number, a bank account number, a credit card number, a credit card expiry date, a credit card verification value (CVV), a passport number, a phone number, and an email address.

Figure 1A:
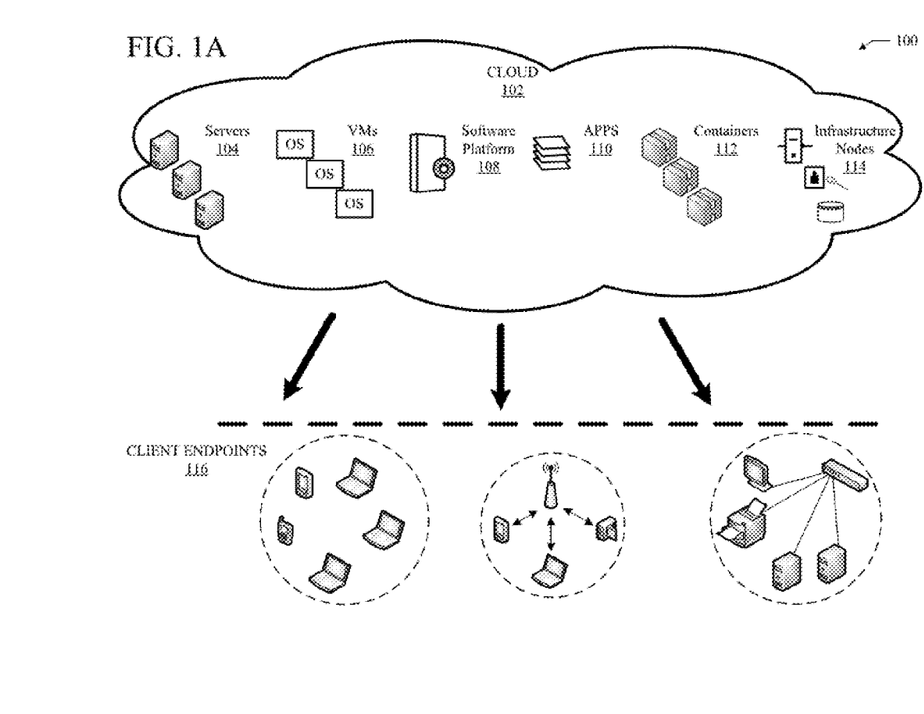
FIG. 1A illustrates an example cloud computing architecture.

FIG. 1A illustrates a diagram of an example cloud computing architecture 100. The architecture can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

The client endpoints 116 can communicate with the elements 104-114 as part of accessing network services through infrastructure intermediation messaging. Specifically, communications between the elements 104-114 and the client endpoints 116 can be managed and otherwise controlled through a network infrastructure between the client endpoints 116 and the cloud 102. For example, either or both an LTE infrastructure and a Wi-Fi infrastructure can communicate a physical location of a client endpoint to a cloud service. In turn, the cloud service can cause the infrastructure to send specific signaling to the client endpoint for accessing network services through the cloud service. For example, the cloud service can use the LTE infrastructure, e.g. through an LTE S14 interface, to alert the client endpoint of Wi-Fi availability through the Wi-Fi infrastructure. In another example, the cloud service can use the Wi-Fi infrastructure, e.g. through MBO Wi-Fi messaging, to alert the client endpoint of LTE availability through the LTE infrastructure.

Figure 1B:
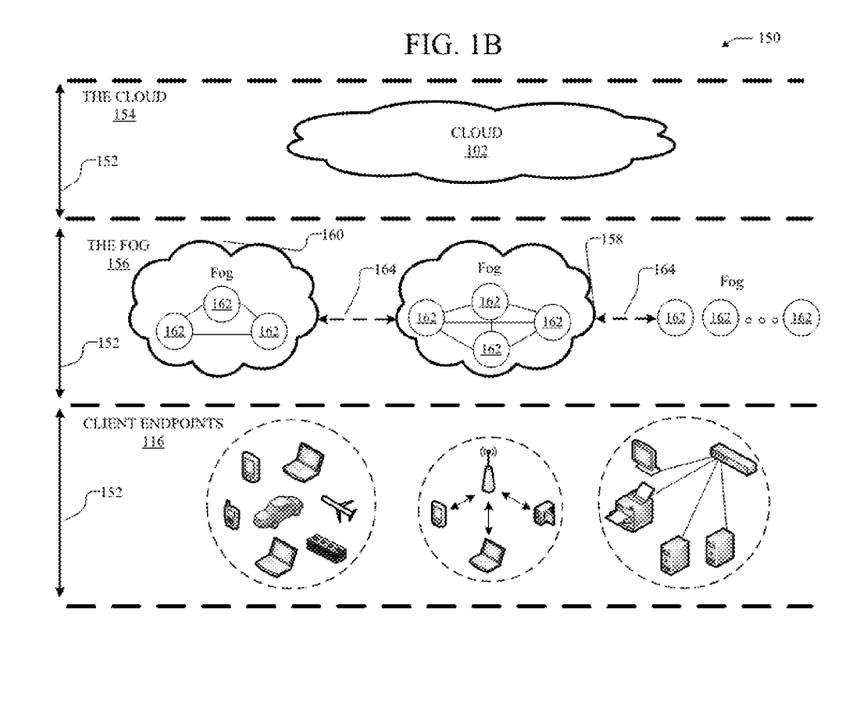
FIG. 1B illustrates an example fog computing architecture.

FIG. 1B illustrates a diagram of an example fog computing architecture 150. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 160 can be local or regional clouds or networks. For example, the fog instances 158, 160 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

As discussed previously, providing security in the communication of PII is always important in network environments. Specifically, in microservice-based network environments, PII can be inadvertently leaked as microservices exchange information with each other, e.g. in providing access to network services. In particular, as microservice-based network environments grow in prevalence and the amount of information that is exchanged between microservices increases, the possibility of leaking PII in a network environment increases. There therefore exist needs for preventing PII in microservice-based network environments.

The present technology includes systems, methods, and computer-readable media for solving these problems/discrepancies.

Figure 2:
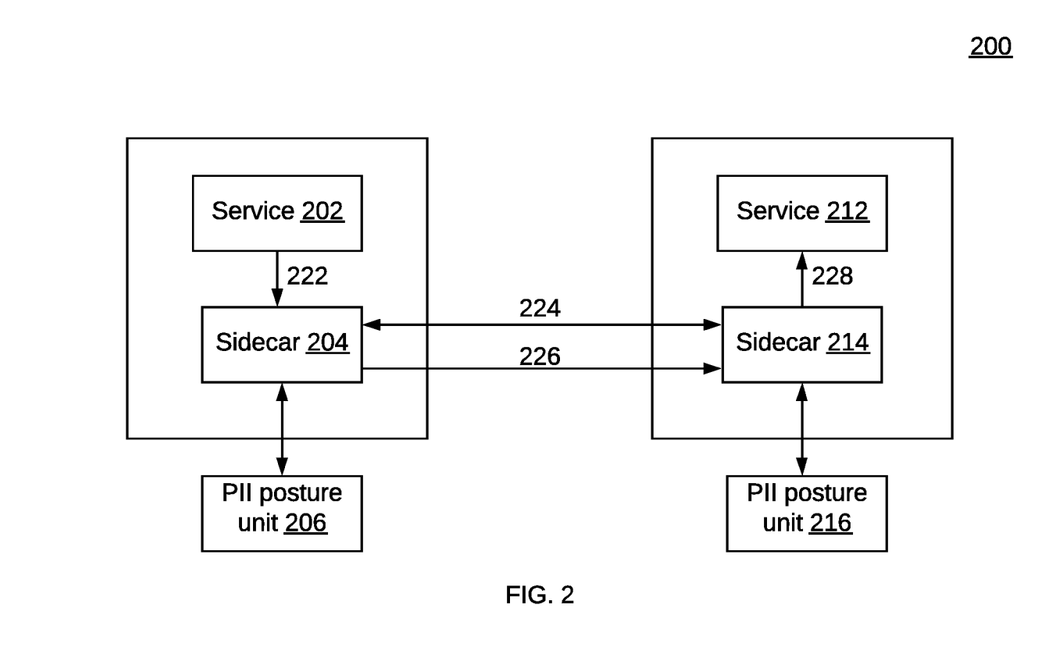
FIG. 2 illustrates an example of a network architecture in accordance with an embodiment.

FIG. 2 illustrates an example of a network architecture 200 in accordance with an embodiment. An example of the network architecture 200 is a microservices-based architecture. However, one of ordinary skill in the art will understand that, for the network architecture 200 and any other system discussed in the present disclosure, there can be additional or fewer components in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure. Specifically, the network architecture 200 can be implemented, at least in part, through an applicable network environment, such as the network architectures 100 and 150 shown in FIGS. 1A and 1B.

As shown in FIG. 2, network architecture 200 includes services 202 and 212. This is to illustrate communications between any two example services included in network 200, but not to limit the number of services that can be included in the network architecture 200. In some embodiments, example services 202 and 212 are microservices. In some embodiments, at least one micro service can form at least part of an application implemented, at least in part, in the microservice based network architecture 200. Microservice 202 includes a sidecar 204, and microservice 212 includes a sidecar 214. Sidecars 204 and 214 can function according to an applicable sidecar. Specifically, sidecars 204 and 214 intercept traffic going in and out of the corresponding microservices 202 and 212, and can enforce one or more policies on the intercepted traffic. More specifically, the sidecars 204 and 214 can act as privacy enforcers for the communication of PII between corresponding services 202 and 212. While reference is made to sidecars throughout this disclosure, an applicable system or application for intercepting traffic between microservices and/or enforcing policy on the intercepted traffic can perform the functions of the sidecars.

Microservices included in the network architecture 200 can be sidecar-agnostic, e.g. unaware of the injection of their corresponding sidecars 204 and 214 and/or any action performed by their corresponding sidecars. Specifically, and as will be discussed in greater detail later, the sidecars 204 and 214 can intercept traffic transmitted between the service 202 and the service 212 without the knowledge of the corresponding services 202 and 212. In turn, the sidecars 204 and 214 can perform actions, e.g. as part of applying policies based on the intercepted traffic, to control the exchange of PII between the services 202 and 212 without the knowledge of the services 202 and 212.

Data planes 222, 226, and 228 can be used to transmit PII from service 202 to service 212 through the sidecars 204 and 214. However, this is for the ease of description only, and the direction or the scale of the PII communication is not limited by this example. In some embodiments, communication can be conducted in the opposite direction from service 212 to service 202, through data planes 228, 226, and 222. In other words, any one of the microservices included in the network 200 can be either the generator or the receiver of the PII. In some embodiments, either the generator or the receiver of the PII in a specific PII communication can include many microservices of the network 200. Specifically, an application implemented through the network 200 can be formed through a plurality of microservices in the network 200. PII posture units 206 and 216 can be coupled to the sidecars 204 and 214, respectively, to manage PII postures of the corresponding microservices 202 and 212.

Figure 3:
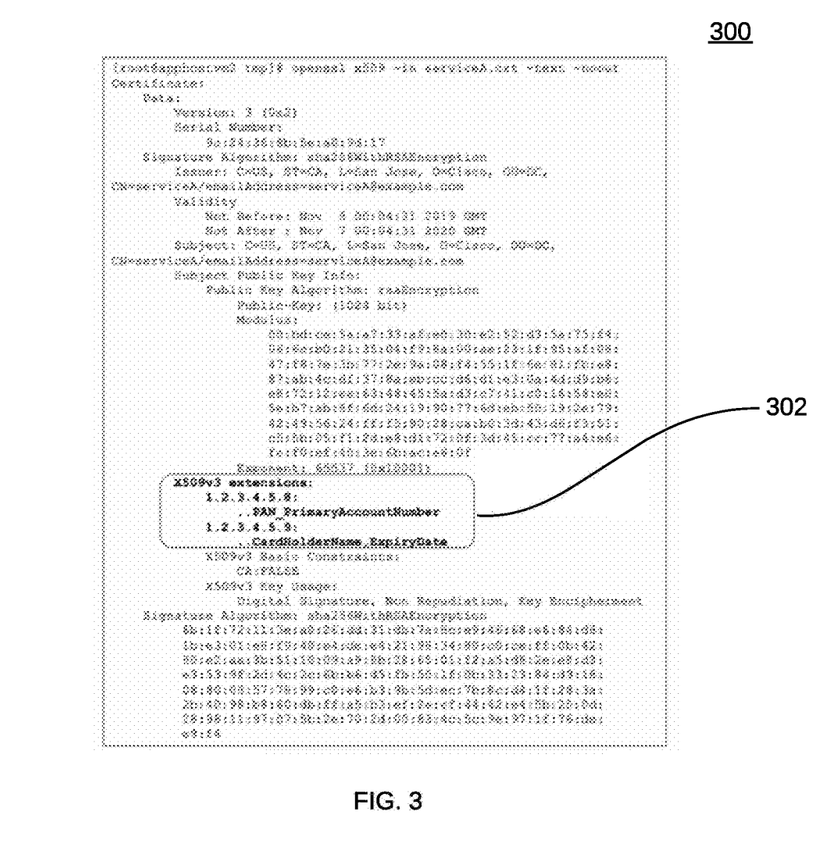
FIG. 3 illustrates an example identity certificate of a service in accordance with an embodiment.

FIG. 3 illustrates an example identity certificate 300 of a microservice in accordance with an embodiment. In some embodiments, such an identity certificate 300 can be used for authenticating the identity of the service 202 or 212. The example identity certificate 300 shown in FIG. 3 includes information indicating a PII posture 302 of one of the microservice 202 or 212. Specifically, the PII posture 302 can be embedded into the identity certificate 300, e.g. as x509 extensions.

PII posture can include applicable information related to transmission and receipt of PII by a microservice. A PII posture can specify rules for controlling communication of PII between microservices in a microservice-based network environment. In some embodiments, the PII posture 302 of the microservice 202 or 212 includes an identification of one or more types of PII that the microservice 202 or 212 is authorized to distribute and one or more types of PII that the microservice 202 or 212 is authorized to receive.

Moreover, the posture 302 can also include actions to be performed on the PII if the PII being communicated is not the one or more types of PII that the microservice is authorized to distribute or receive. Actions can include applicable actions that can be taken in regulating transmission of PII across microservices. For example, as specified as part of PII, actions can include refraining from transmitting PII intercepted at a sidecar, refraining from passing received PII to a microservice of a corresponding sidecar that intercepts the PII, generating and sending an alert indicating that PII has been sent or received in violation of rules for controlling communication of PII, and passing PII received at a sidecar to a corresponding microservice even if the PII is sent or received in violation of the rules for controlling communication of PII. For example, a PII posture can indicate dropping the PII from a sidecar, e.g. refrain from passing the PII to a corresponding microservice of the sidecar, if the microservice is not allowed to receive the PII. Further in the example, the PII posture can indicate dropping the PII from the sidecar if the microservice that transmitted the PII is not allowed to transmit the PII, e.g. according to rules for controlling communication of PII. In another example, a PII posture can indicate allowing the PII to pass to a microservice while also sending out an alert if the PII is received in violation of rules for controlling communication of PII.

Actions can also include anonymizing PII. This action can be taken when passing PII received at a sidecar to a corresponding microservice even if the PII is sent or received in violation of the rules for controlling communication of PII. Such anonymizing could include redacting all or part of the PII, replacing all or part of the PII with symbols, or replacing all or part of the PII with a notification. In some embodiments, once the sidecar confirmed that all of the PII violates the rules, the sidecar could anonymize all of the PII. In some embodiments, once the sidecar confirmed that part of the PII violates the rules, the sidecar could anonymize that part of the PII.

Such a posture of the microservices 202 or 212 can be set up by the system operator of network 200. In some embodiments, corresponding sidecars of the microservices can exchange such identity certificates with each other to authenticate the identity of the other micro service, to exchange the embedded PII postures, and to further authenticate the validity of the embedded PII postures at the sidecars. The authentication process will be discussed in more detail with regard o FIG. 4. Such an exchange will be explained in detail with regard to FIG. 4. In some embodiments, in order to change the PII posture, the identity certificate 200 would need to be regenerated with the updated PII posture 302, and the distributing/exchanging PII postures through distributing/exchanging identity certificates would need to be conducted again. The sidecars 204 and 214 can also selectively apply one or more of the different postures of the first micro service based on characteristics of either or both the first micro service and the second micro service to control communication of the PII between the microservice 202 and the microservice 212. Such characteristics of the micro services can include, but are not limited to the location of one or both micro services that are engaged in a PII communication, the local time of the PII communication. For an example including location as the deciding characteristic, when both micro services engaged in the same PII communication are at the same network environment, premise, or enterprise, at least one sidecar would send out an alert even for the transmission of unauthorized PII such as credit card information. In another example using location as the deciding characteristic, when both microservices engaged in the same PII communication are not at the same network environment, premise, or enterprise, at least one sidecar would drop or anonymize the unauthorized PII such as credit card information.

Figure 4:
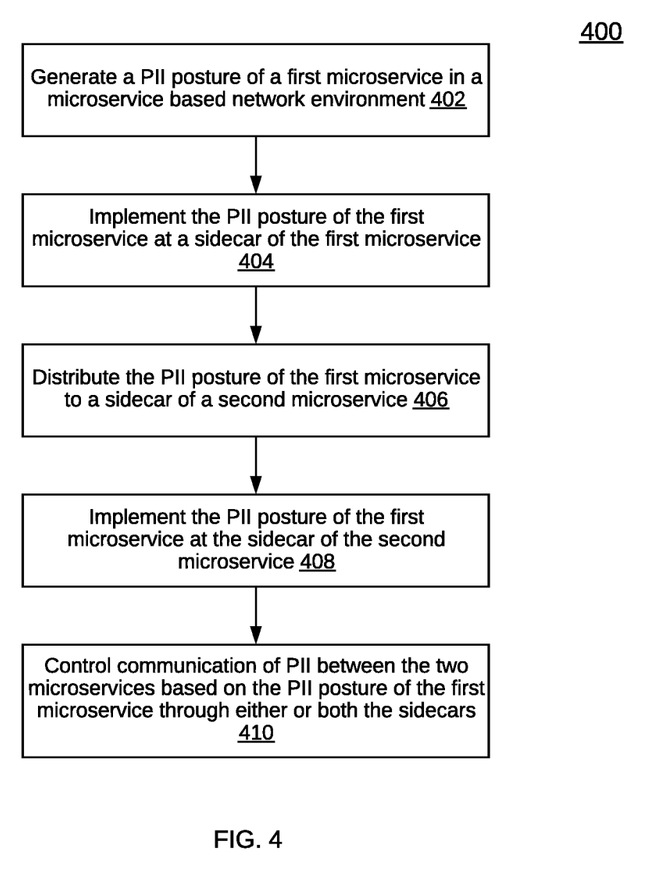
FIG. 4 illustrates an example method for a policy based Personally Identifiable Information (PII) communication mechanism to prevent PII leakage in accordance with an embodiment.

FIG. 4 illustrates an example method 400 for a policy based PII communication mechanism to prevent PII leakage in accordance with an embodiment. The method shown in FIG. 4 is provided by way of example, as there are a variety of ways to carry out the method. Additionally, while the example method is illustrated with a particular order of steps, those of ordinary skill in the art will appreciate that FIG. 4 and the modules shown therein can be executed in any order and can include fewer or more modules than illustrated.

Each module shown in FIG. 4 represents one or more steps, processes, methods or routines in the method. For the sake of clarity and explanation purposes, the modules in FIG. 4 are described with reference to the network architecture 200 shown in FIG. 2.

A first PII posture unit generates a first PII posture of a corresponding first micro service in a microservice based network environment (402). In some embodiments, the first PII posture unit can be the PII posture units 206 or 216, and the first microservice can be one of the microservices 202 or 212 of the network 200. In some embodiments, along with the instantiation of the first service, the PII posture of the first microservice is embedded into the identity certificate of the first microservice, as explained above. Such PII posture can include the types of PII that the first microservice can transmit or receive.

The first PII posture unit then implements the first PII posture at a first sidecar of the first microservice (404). In some embodiments, the first PII posture unit can be one of the PII posture units 206 or 216, the first sidecar can be one of the sidecars 204 or 214, and the first microservice can be one of the microservices 202 or 212 of the network 200.

The first sidecar distributes the first PII posture of the first microservice to a second sidecar of a second microservice (406). In some embodiments, the first sidecar can be one of the sidecars 204 and 214, the second sidecar can be the other one of the sidecars 204 and 214. In some embodiments, the second sidecar of the second microservice distributes a second PII posture of the second microservice to the first sidecar of the first microservice, e.g. in response to or in concert with the distribution of the first PII posture of the first microservice. In some embodiments, when both PII postures are embedded in the corresponding identity certificate as explained above, the above distributing PII posture processes can be performed as an exchange of the identity certificates of two microservices. Such an exchange of identity certificates can be conducted through a mutual TLS (Transport Layer Security) session 224 established between sidecars 204 and 214 before the communication of PII. By setting up the mutual TLS session 224, sidecars 204 and 214 can also validate the identity of each other as the generator and receiver of the PII through the identify certificates.

There could be an optional step to be performed after the distribution/exchanging of the postures between the sidecars. Either one of the sidecars 204 and 214 can verify the posture of the other microservice is valid, and then control communication of the PII after the postures are verified as valid. Such a verification process can be done by checking the identity certificates that the postures embedded in. For example, a posture can be deemed as valid if the identity certificate it embedded in is authenticated.

The second sidecar of the second microservice implements the PII posture of the first microservice at the second sidecar (408). In some embodiments, after exchanging the identity certificates, the first sidecar of the first microservice can implement the PII posture of the second microservice at the first sidecar, e.g. at the same time.

After the implementation of the PII postures, either or both the first sidecar of the first microservice and the second sidecar of the second microservice control communication of PII between the first microservice and the second microservice based on the posture of the first microservice (410). In some embodiments, after exchanging the identity certificates, the controlling of the communication of PII can also be based on the PII posture of the second microservice. In some embodiments, either or both the first sidecar of the first microservice and the second sidecar of the second microservice can perform actions on the portion of PII that does not comply with either or both the PII postures of the first and second microservices. Such processes will be described in more detail with regard to FIGS. 4 and 5.

In some embodiments, the actions included in the example method 400 are performed by the sidecars independent of the microservices 202 and 212. In other words, the microservices 202 and 212 can be sidecar-agnostic and otherwise unaware of one or an applicable combination of the steps included in the example method 400.

Figure 5:
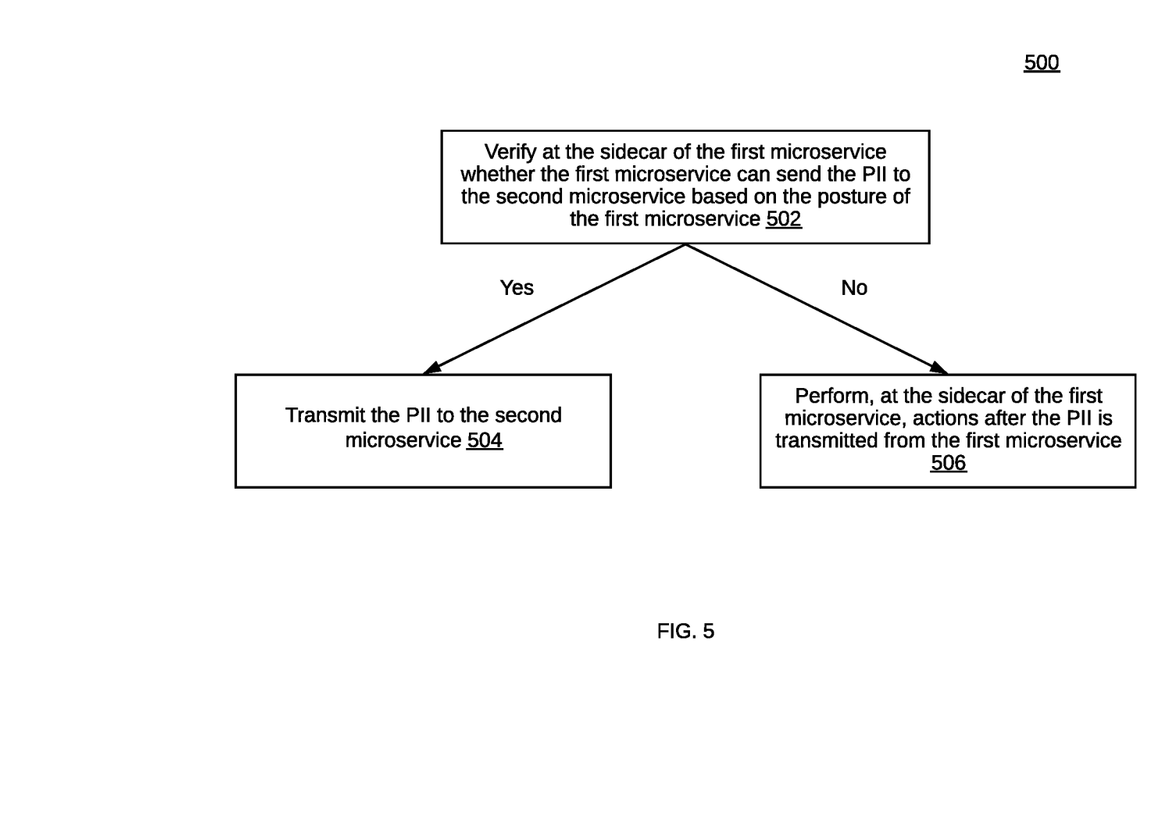
FIG. 5 illustrates an example diagram for a policy based PII communication control in accordance with an embodiment.

FIG. 5 illustrates an example diagram 500 for a policy based PII communication control in accordance with an embodiment. This example 500 can be performed as part of the PII communication control. The method shown in FIG. 5 is provided by way of example, as there are a variety of ways to carry out the method. Additionally, while the example method is illustrated with a particular order of steps, those of ordinary skill in the art will appreciate that FIG. 5 and the modules shown therein can be executed in any order and can include fewer or more modules than illustrated.

Each module shown in FIG. 5 represents one or more steps, processes, methods or routines in the method. For the sake of clarity and explanation purposes, the modules in FIG. 5 are described with reference to the network architecture 200 shown in FIG. 2.

The first sidecar verifies whether the first microservice can send the PII to the second microservice based on the PII posture of the first microservice (502). In some embodiments, the first sidecar can be one of the sidecars 204 or 214, and the first or second micro services can be either one of the microservice 202 or microservice 212. This diagram illustrates when the first microservice is the generator of the PII and the second microservice is the receiver of the PII. However, this is for the ease of description only, and does not limit the micro services in specific roles, as any number of the micro services included in network 200 can be either the generator or receiver of the PII.

If the first microservice can send the PII to the second microservice, e.g. as indicated by the PII posture of the first micro service, then the first sidecar transmits the PII to the second microservice (504). In some embodiments, before the PII is transmitted to the second micro service, the PII is first intercepted by the second sidecar of the second micro service.

If the first microservice cannot send the PII to the second microservice, e.g. as indicated by the PII posture of the first micro service, the first sidecar performs actions after the PII is transmitted from the first microservice to the first sidecar (506). In some embodiments, when only part of the PII does not comply with the first posture of the first micro service, the first sidecar drops this part of the PII, and transmits the rest of the PII to the second micro service. Moreover, either or both the first microservice and the second microservice can be unaware of this PII communication control process.

Figure 6:
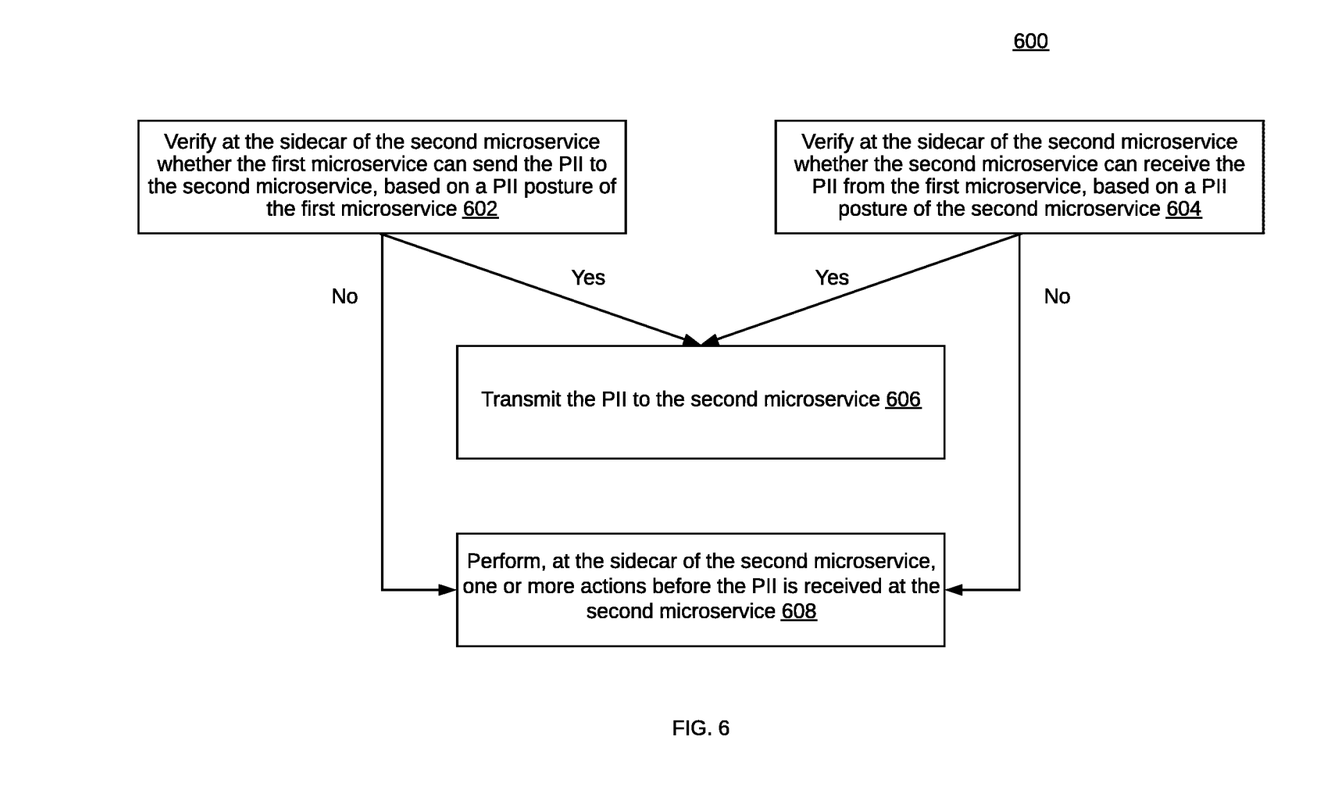
FIG. 6 illustrates an example diagram for a policy based PII communication control in accordance with an embodiment.

FIG. 6 illustrates an example diagram 600 for a policy based PII communication control in accordance with an embodiment. This example 600 can be performed as part of the PII communication control.

The method shown in FIG. 6 is provided by way of example, as there are a variety of ways to carry out the method. Additionally, while the example method is illustrated with a particular order of steps, those of ordinary skill in the art will appreciate that FIG. 6 and the modules shown therein can be executed in any order and can include fewer or more modules than illustrated.

Each module shown in FIG. 6 represents one or more steps, processes, methods or routines in the method. For the sake of clarity and explanation purposes, the modules in FIG. 6 are described with reference to the network architecture 200 shown in FIG. 2.

After the verification process at the first sidecar, as explained above with regard to FIG. 5, when the first sidecar transmits the PII to the second micro service, the second sidecar intercepts the PII. Then, the second sidecar verifies whether the first micro service can send the PII to the second microservice based on the PII posture of the first microservice (602). In some embodiments, the first sidecar can be one of the sidecars 204 or 214, and the first or second microservices can be either one of the service 202 or service 212. This diagram 600 illustrates when the first microservice is the generator of the PII and the second microservice is the receiver of the PII. However, this is for the ease of description only, and does not limit the microservices in specific roles, as any number of the microservices included in network 200 can be either the generator or receiver of the PII. The PII posture of the first microservice is received by the second sidecar through the distributing/exchanging of identity certificate process as explained above with regard to FIGS. 3 and 4.

If the first microservice can send the PII to the second microservice based on the PII posture of the first micro service, the second sidecar transmits the PII to the second microservice (606).

If the first microservice cannot send the PII to the second microservice based on the PII posture of the first micro service, the second sidecar performs one or more actions before the PII is received at the second microservice (608). In some embodiments, when only part of the PII does not comply with the first posture of the first microservice, the second sidecar drops this part of the PII, and transmit the rest of the PII to the second micro service.

The second sidecar also verifies whether the second microservice can receive the PII from the first microservice based on the PII posture of the second microservice (604). Processes 502, 602, or 604 are performed independent of the other processes, but at least one of these processes is performed according to an embodiment. In some embodiments, when process 502 is not performed, process 602 would be performed. In some embodiments, an authentication process to check whether the identity certificates have been tampered with would also be performed, alone with any of the processes 502, 602, or 604.

If the second microservice can receive the PII from the first microservice based on the PII posture of the second microservice, the second sidecar transmits the PII to the second microservice (606).

If the second micro service cannot receive the PII from the first micro service based on the PII posture of the second micro service, the second sidecar performs one or more actions before the PII is received at the second micro service (608). In some embodiments, when only part of the PII does not comply with the second posture of the second micro service, the second sidecar drops this part of the PII, and transmit the rest of the PII to the second micro service.

Moreover, either or both the first micro service and the second micro service can be unaware of the above PII communication control processes as shown in FIG. 6.

Figure 7:
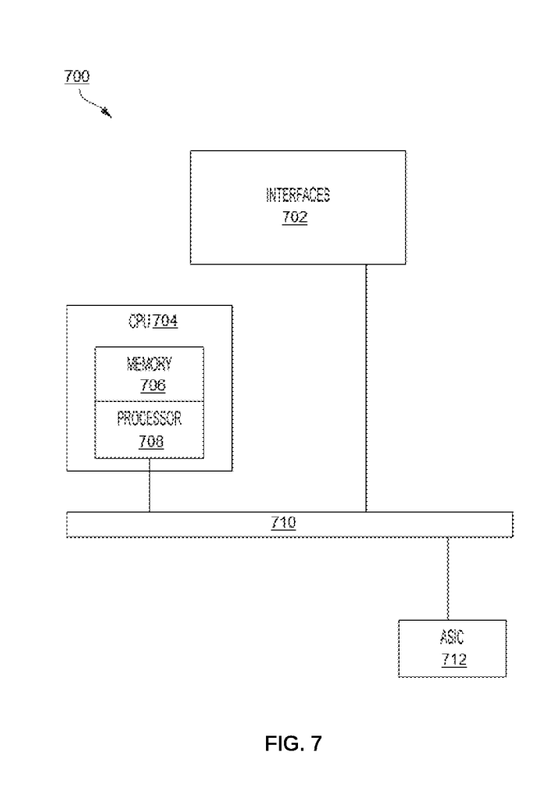
FIG. 7 illustrates an example of a network device.

FIG. 7 illustrates an example of a network device 700 (e.g., switch, router, network appliance, etc.). Such a network device 700 can be the PII posture unit 206, and the PII posture unit 216. The network device 700 can include a master central processing unit (CPU) 704, interfaces 702, and a bus 710 (e.g., a PCI bus). When acting under the control of appropriate software or firmware, the CPU 704 can be responsible for executing packet management, error detection, and/or routing functions. The CPU 704 preferably accomplishes all these functions under the control of software including an operating system and any appropriate applications software. The CPU 704 may include one or more processors 708 such as a processor from the Motorola family of microprocessors or the MIPS family of microprocessors. In an alternative embodiment, the processor 708 can be specially designed hardware for controlling the operations of the network device 700. In an embodiment, a memory 706 (such as non-volatile RAM and/or ROM) can also form part of the CPU 704. However, there are many different ways in which memory could be coupled to the system.

The interfaces 702 can be provided as interface cards (sometimes referred to as line cards). The interfaces 702 can control the sending and receiving of data packets over the network and sometimes support other peripherals used with the network device 700. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 704 may include ports appropriate for communication with the appropriate media. In some cases, the interfaces 702 may also include an independent processor and, in some instances, volatile RAM. The independent processors may control communication intensive tasks such as packet switching, media control, and management. By providing separate processors for the communication intensive tasks, the interfaces 702 may allow the CPU 704 to efficiently perform routing computations, network diagnostics, security functions, and so forth.

Although the system shown in FIG. 7 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 700.

Regardless of the network device's configuration, it may employ one or more memories or memory modules (including the memory 706) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 8:
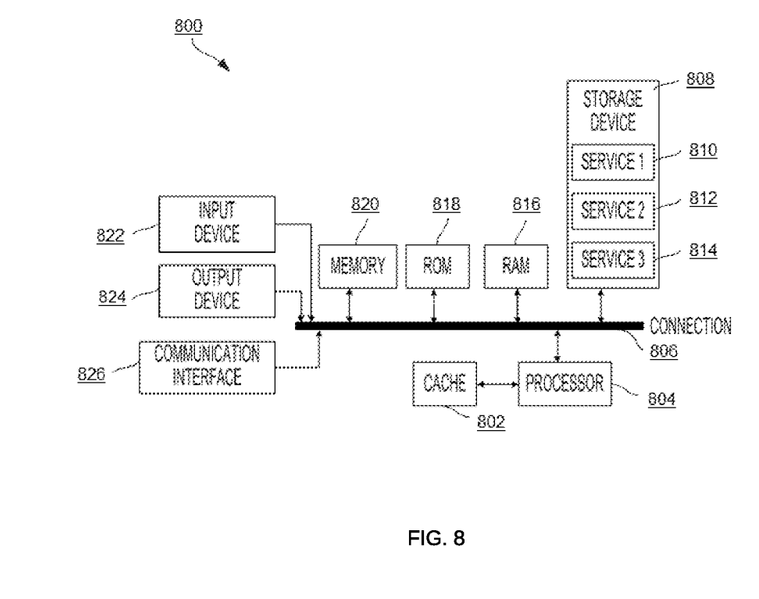
FIG. 8 illustrates an example of a bus computing system wherein the components of the system are in electrical communication with each other using a bus.

FIG. 8 illustrates an example of a bus computing system 800 wherein the components of the system are in electrical communication with each other using a bus 806. The computing system 800 can include a processing unit (CPU or processor) 804 and a system bus 806 that may couple various system components including the system memory 820, such as read only memory (ROM) 818 and random access memory (RAM) 816, to the processor 804. The computing system 800 can include a cache 802 of high-speed memory connected directly with, in close proximity to, or integrated as part of the processor 804. The computing system 800 can copy data from the memory 820, ROM 818, RAM 816, and/or storage device 808 to the cache 802 for quick access by the processor 804. In this way, the cache 802 can provide a performance boost that avoids processor delays while waiting for data. These and other modules can control the processor 804 to perform various actions. Other system memory 820 may be available for use as well. The memory 820 can include multiple different types of memory with different performance characteristics. The processor 804 can include any general purpose processor and a server, a hardware module or software module, such as module 810, module 812, and module 814 stored in the storage device 808, configured to control the processor 804 as well as a special-purpose processor where software instructions are incorporated into the actual processor design. The processor 804 may essentially be a completely self-contained computing system, containing multiple cores or processors, a bus, memory controller, cache, etc. A multi-core processor may be symmetric or asymmetric.

To enable user interaction with the computing system 800, an input device 822 can represent any number of input mechanisms, such as a microphone for speech, a touch-protected screen for gesture or graphical input, keyboard, mouse, motion input, speech and so forth. An output device 824 can also be one or more of a number of output mechanisms known to those of skill in the art. In some instances, multimodal systems can enable a user to provide multiple types of input to communicate with the computing system 800. The communications interface 826 can govern and manage the user input and system output. There may be no restriction on operating on any particular hardware arrangement and therefore the basic features here may easily be substituted for improved hardware or firmware arrangements as they are developed.

The storage device 808 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 808 can include the service or software modules 810, 812, 814 for controlling the processor 804. Other hardware or software modules are contemplated. The storage device 808 can be connected to the system bus 806. In some embodiments, a hardware module that performs a particular function can include a software component stored in a computer-readable medium in connection with the necessary hardware components, such as the processor 804, bus 806, output device 824, and so forth, to carry out the function.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, media, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
  generating a posture of a first microservice in a microservice based network environment, wherein the posture of the first microservice includes an identification of one or more types of personally identifiable information that the first microservice is authorized to distribute to the second microservice and one or more types of personally identifiable information that the second microservice is authorized to receive from the first microservice;
  implementing the posture of the first microservice at a first sidecar of the first microservice;
  distributing the posture of the first microservice to a second sidecar of a second microservice in the microservice based network environment;
  verifying at the first microservice that the second microservice can receive the personally identifiable information from the first microservice based on receiving a posture of the second microservice;
  implementing the posture of the first microservice at the second sidecar of the second microservice; and
  controlling communication of personally identifiable information between the first microservice and the second microservice based on whether it is verified that the second microservice can receive the personally identifiable information through the first sidecar or the second sidecar based on the posture of the first microservice.

2. The method of claim 1, wherein the personally identifiable information includes personally identifiable information originating at the first microservice.

3. The method of claim 2, further comprising:
  verifying at the sidecar of the first microservice whether the first microservice can send the personally identifiable information to the second microservice based on the posture of the first microservice; and performing, at the sidecar of the first microservice, one or more actions after the personally identifiable information is transmitted from the first microservice based on whether it is verified that the first microservice can send the personally identifiable information to the second microservice.

4. The method of claim 2, further comprising:
verifying at the sidecar of the second microservice whether the first microservice can send the personally identifiable information to the second microservice based on the posture of the first microservice; and
performing, at the sidecar of the second microservice, one or more actions either or both before and after the personally identifiable information is received at the second microservice based on whether it is verified that the first microservice can send the personally identifiable information to the second microservice.

5. The method of claim 2, further comprising:
verifying at the sidecar of the second microservice whether the second microservice can receive the personally identifiable information from the first microservice based on a posture of the second microservice, wherein the posture of the second microservice includes an identification of one or more types of personally identifiable information that the second microservice is authorized to distribute and one or more types of personally identifiable information that the second microservice is authorized to receive; and
performing, at the sidecar of the second microservice, one or more actions either or both before and after the personally identifiable information is received at the second microservice based on whether it is verified that the second microservice can receive the personally identifiable information from the first microservice.

6. The method of claim 2, further comprising:
generating a posture of the second microservice, wherein the posture of the second microservice includes an identification of one or more types of personally identifiable information that the second microservice is authorized to distribute and one or more types of personally identifiable information that the second microservice is authorized to receive;
implementing the posture of the second microservice at the sidecar of the second microservice;
distributing the posture of the second microservice to the sidecar of the first microservice in the microservice based network environment; and
performing, at the sidecar of the first microservice, one or more actions after the personally identifiable information is transmitted from the first microservice based on the verification that the second microservice can receive the personally identifiable information from the second microservice.

7. The method of claim 1, wherein the one or more types of personally identifiable information that the first microservice is authorized to receive is based, at least in part, on one or more types of personally identifiable information that the second microservice is authorized to distribute.

8. The method of claim 1, further comprising:
distributing the posture of the first microservice to corresponding sidecars of a plurality of microservices in the microservice based network environment;
implementing the posture of the first microservice at the corresponding sidecars of the plurality of microservices; and
controlling communication of one or more different types of personally identifiable information between the first microservice and the plurality of microservices based on the posture of the first microservice through either or both the sidecar of the first microservice and at least one of the corresponding sidecars of the plurality of microservices.

9. The method of claim 8, wherein the first microservice and at least one of the plurality of microservices in the microservice based network environment form at least part of an application implemented, at least in part, in the microservice based network environment.

10. The method of claim 1, wherein either or both the first microservice and the second microservice are sidecar-agnostic with respect to at least the controlling of communication of the personally identifiable information through either or both the sidecar of the first microservice and the sidecar of the second microservice based on the posture of the first microservice.

11. The method of claim 1, further comprising:
embedding the posture of the first microservice into an identity certificate; and
transmitting the identity certificate with the embedded posture of the first microservice to the sidecar of the second microservice as part of establishing a connection between the first microservice and the second microservice in the microservice based network environment.

12. The method of claim 1, further comprising:
verifying, at the sidecar of the second microservice that the posture of the first microservice is valid; and
controlling communication of the personally identifiable information based on the posture of the first microservice through the sidecar of the second microservice based on whether the posture of the first microservice is verified as valid.

13. The method of claim 1, wherein the posture of the first microservice is part of a plurality of different postures of the first microservice, the method further comprising selectively applying one or more of the plurality of different postures of the first microservice based on characteristics of either or both the first microservice and the second microservice to control communication of the personally identifiable information between the first microservice and the second microservice.

14. The method of claim 1, further comprising performing one or more actions at either or both the sidecar of the first microservice and the sidecar of the second microservice to control communication of the personally identifiable information between the first microservice and the second microservice based on the posture of the first microservice.

15. A system comprising:
one or more processors; and
at least one computer-readable storage medium having stored therein instructions which, when executed by the one or more processors, cause the one or more processors to perform operations comprising:
generating a posture of a first microservice in a microservice based network environment, wherein the posture of the first microservice includes an identification of one or more types of personally identifiable information that the first microservice is authorized to distribute to the second microservice;
implementing the posture of the first microservice at a first sidecar of the first microservice;
distributing the posture of the first microservice to a second sidecar of a second microservice in the microservice based network environment;

verifying at the first microservice that the second microservice can receive the personally identifiable information from the first microservice based on receiving a posture of the second microservice;

implementing the posture of the first microservice at the second sidecar of the second microservice; and controlling communication of personally identifiable information between the first microservice and the second microservice based on whether it is verified that the second microservice can receive the personally identifiable information through the first sidecar or the second sidecar based on the posture of the first microservice.

16. The system of claim 15, wherein the personally identifiable information includes personally identifiable information originating at the first microservice and the instructions which, when executed by the one or more processors, further cause the one or more processors to perform operations comprising:

verifying at the sidecar of the first microservice whether the first microservice can send the personally identifiable information to the second microservice based on the posture of the first microservice; and performing, at the sidecar of the first microservice, one or more actions after the personally identifiable information is transmitted from the first microservice based on whether it is verified that the first microservice can send the personally identifiable information to the second microservice.

17. The system of claim 15, wherein the personally identifiable information includes personally identifiable information originating at the first microservice and the instructions which, when executed by the one or more processors, further cause the one or more processors to perform operations comprising:

verifying at the sidecar of the second microservice whether the first microservice can send the personally identifiable information to the second microservice based on the posture of the first microservice; and performing, at the sidecar of the second microservice, one or more actions either or both before and after the personally identifiable information is received at the second microservice based on whether it is verified that the first microservice can send the personally identifiable information to the second microservice.

18. The system of claim 15, wherein the personally identifiable information includes personally identifiable information originating at the first microservice and the instructions which, when executed by the one or more processors, further cause the one or more processors to perform operations comprising:

verifying at the sidecar of the second microservice whether the second microservice can receive the personally identifiable information from the first microservice based on a posture of the second microservice, wherein the posture of the second microservice includes an identification of one or more types of personally identifiable information that the second microservice is authorized to distribute and one or more types of personally identifiable information that the second microservice is authorized to receive; and performing, at the sidecar of the second microservice, one or more actions either or both before and after the personally identifiable information is received at the second microservice based on whether it is verified that the second microservice can receive the personally identifiable information from the first microservice.

19. The system of claim 15, wherein the personally identifiable information includes personally identifiable information originating at the first microservice and the instructions which, when executed by the one or more processors, further cause the one or more processors to perform operations comprising:

generating a posture of the second microservice, wherein the posture of the second microservice includes an identification of one or more types of personally identifiable information that the second microservice is authorized to distribute and one or more types of personally identifiable information that the second microservice is authorized to receive;

implementing the posture of the second microservice at the sidecar of the second microservice;

distributing the posture of the second microservice to the sidecar of the first microservice in the microservice based network environment; and performing, at the sidecar of the first microservice, one or more actions after the personally identifiable information is transmitted from the first microservice based on whether it is verified that the second microservice can receive the personally identifiable information from the second microservice.

20. A non-transitory computer-readable storage medium having stored therein instructions which, when executed by one or more processors, cause the one or more processors to perform operations comprising:

generating a posture of a first microservice in a microservice based network environment, wherein the posture of the first microservice includes an identification of one or more types of personally identifiable information that the first microservice is authorized to distribute to the second microservice and one or more types of personally identifiable information that the second microservice is authorized to receive from the first microservice;

implementing the posture of the first microservice at a first sidecar of the first microservice;

distributing the posture of the first microservice to corresponding sidecars of a plurality of microservices in the microservice based network environment;

verifying at the first microservice that each of the plurality of microservices can receive the personally identifiable information from the first microservice based on receiving a posture of each of the plurality of microservices;

implementing the posture of the first microservice at the corresponding sidecars of each of the plurality of microservices; and controlling communication of personally identifiable information between the first microservice and the plurality of microservices based on whether it is verified that each of the plurality of microservices can receive the personally identifiable information through the first sidecar or the corresponding sidecars based on the posture of the first microservice.

* * * * *